(12) United States Patent
Nagano

(10) Patent No.: US 8,630,001 B2
(45) Date of Patent: Jan. 14, 2014

(54) IMAGE FORMING APPARATUS

(75) Inventor: Daisaku Nagano, Chuo-ku (JP)

(73) Assignee: Kyocera Document Solutions Inc., Osaka (JP)

( * ) Notice: Subject to any disclaimer, the term of this patent is extended or adjusted under 35 U.S.C. 154(b) by 1098 days.

(21) Appl. No.: 12/231,599

(22) Filed: Sep. 3, 2008

(65) Prior Publication Data

US 2009/0059291 A1 Mar. 5, 2009

(30) Foreign Application Priority Data

Sep. 4, 2007 (JP) ................................. 2007-228720
Sep. 4, 2007 (JP) ................................. 2007-228724

(51) Int. Cl.
*G06F 3/12* (2006.01)
(52) U.S. Cl.
USPC .......... 358/1.15; 358/1.13; 358/440; 358/468
(58) Field of Classification Search
USPC .............. 358/1.15, 438, 1.13, 1.16, 401, 402, 358/403, 405, 407, 440, 442, 444, 468; 379/93.23, 121.06, 355.02, 355.04, 379/355.05, 355.06, 355.07, 355.09
See application file for complete search history.

(56) References Cited

U.S. PATENT DOCUMENTS

| | | | |
|---|---|---|---|
| 7,161,697 B2 * | 1/2007 | Yajima | 358/1.15 |
| 2006/0044621 A1 * | 3/2006 | Ohhata et al. | 358/438 |
| 2007/0019227 A1 * | 1/2007 | Hibino et al. | 358/1.15 |

FOREIGN PATENT DOCUMENTS

| | | |
|---|---|---|
| JP | 62-163449 | 7/1987 |
| JP | 11-234445 | 8/1999 |
| JP | 2003-298823 | 10/2003 |

* cited by examiner

*Primary Examiner* — Vu B Hang
(74) *Attorney, Agent, or Firm* — Jordan and Hamburg LLP

(57) ABSTRACT

At the time of changing a communication destination, when there is a registered program referencing a communication destination related to the change, a main control section 11 confirms a user's intention related on whether to reflect in an appropriate registered program the change related to the communication destination, and according to the user's intention thus obtained, decides whether to reflect the change related to the communication destination in the appropriate registered program. Thereby, even when there is the change related to the communication destination, the change related to the communication destination can be properly conducted through preventing an erroneous transmission to a destination against the user's intention.

9 Claims, 5 Drawing Sheets

IMAGE FORMING APPARATUS

TECHNICAL FIELD

The present invention relates to an image forming apparatus provided with a program function for registering, as a program, at least one of a plurality of communication destinations and an initial value related to a function item, and more particularly, relates to an image forming apparatus capable of properly conducting a change related to a data communication destination or a change of the initial value related to the function item.

BACKGROUND ART

Conventionally, for example, in an image forming apparatus having various functions such as copying, facsimile transmission/reception, printing, and data communication, multi-functions are developed to satisfy a large number of different user-side needs. Concurrently with the multi-functions, the number of items for realizing versatile functions is ever increasing. In this case, a user who attempts to conduct the copying or the facsimile transmission/reception, etc., needs to apply a detailed setting to a printing material or a communication method according to his or her request. In this setting task, there is a need for setting each of a plurality of function items, one by one, and thus, an operation procedure becomes complicated. As a result, a large operation load is applied to the user.

As one of the approaches to solve such a problem, there is proposed a facsimile device provided with a so-called "program function" in Japanese Published Unexamined Patent Application No. 62-163449. In this "program function," a plurality of functions can be collectively set with a simple procedure. In the facsimile device related to the above-described conventional technique, setting contents of the plurality of functions are registered and saved on a non-volatile memory as a "program." Thereafter, the program can be invoked to collectively set the setting contents of the plurality of functions registered in the program. Invoking the program can be performed with a simple procedure, and thus, the user can set a plurality of functions with a very simple operation.

Further, as an improved technique of the facsimile device provided with the above-described program function, there is disclosed in Japanese Published Unexamined Patent Application No. 2003-298823, for example, a technique in which when a registration content of a one-touch dial key registered in a register key of a program function is changed, destination number information registered in the one-touch dial key, at the time of information registration in the register key is applied, and this destination number information is used to make a call.

However, in the conventional technique, when the registration content of the one-touch dial key is changed, a changed communication destination, as a communication destination referenced by the program function, is directly adopted without undergoing a user confirmation process. Thus, for example, when the change related to the communication destination is not proper, there is a possibility of performing a transmission operation to an unintended destination.

Further, the conventional technique does not disclose nor suggest a point in which when a content of an initial value related to a certain function item is changed, the changed content is reflected, concurrently with this change, on the initial value related to the function item referenced by the program function. Therefore, in the conventional technique, when the initial value related to the certain function item is changed, the changed content cannot be reflected, concurrently with this change, in the initial value related to the function item referenced by the program function. Thus, there is a possibility that convenience on a user side may be impaired.

SUMMARY OF THE INVENTION

A first object of the present invention is to obtain an image forming apparatus capable of properly conducting a change related to a communication destination through preventing a situation in which an erroneous transmission to an unintended destination is carried out even when there is a change related to the communication destination.

On the other hand, a second object of the present invention is to obtain an image forming apparatus capable of conducting a change of an initial value related to a certain function item in a mode preferable in view of a convenience improvement on a user side.

To achieve the aforementioned first object, an image forming apparatus according to the present invention is an image forming apparatus including: a data communication function; an address book function in which information related to a communication destination can be registered; and a program function in which various information including reference information related to the address book function can be registered, the image forming apparatus, including: a determining section determining, when changing the communication destination, presence or absence of a registered program referencing the communication destination related to the change; an obtaining section obtaining, when as a result of a determination in the determining section, it is determined that an appropriate registered program is present, a user's intention whether to reflect in the appropriate registered program the change related to the communication destination; and a deciding section deciding whether to reflect in the appropriate registered program the change related to the communication destination according to the user's intention obtained in the obtaining section.

The image forming apparatus can adopt a configuration in which communication destination is allotted destination identifying information for uniquely identifying the communication destination, the registered program referencing the communication destination related to the address book function is stored therein with the destination identifying information as registration management information, and the determining section determines the presence or absence of the registered program referencing the communication destination related to the change, through searching whether the destination identifying information is included in the registration management information in each registered program.

The image forming apparatus can adopt a configuration to further include: an operation key used when carrying out various operations including registration or a change of the communication destination; and a display section displaying various information, in which the obtaining section displays on the display section a confirmation screen for allowing a user to select whether to reflect in the appropriate registered program the change related to the communication destination and encourages the user to conduct the selection operation thereby to obtain the user's intention.

The image forming apparatus can adopt a configuration in which the obtaining section displays, together with the confirmation screen for allowing the user to select whether to reflect in the appropriate registered program the change related to the communication destination, changes related to the communication destination, on a display screen of the display section.

On the other hand, to achieve the aforementioned second object, an image forming apparatus according to the present invention is an image forming apparatus including: an initial value changing function capable of changing an initial value related to various function items about an image formation; and a program function which can register, together with reference information associated with the various function items, information related to a combined use of the various function items; the image forming apparatus, including: a determining section determining, at a time of changing an initial value related to a certain function item, presence or absence of a registered program referencing a function item which is a target to be changed; an obtaining section obtaining, when as a result of a determination in the determining section, it is determined that an appropriate registered program is present, a user's intention related on whether to reflect in the appropriate registered program the change of an initial value related to the function item; and a deciding section deciding whether to reflect in the appropriate registered program the change related to the initial value of the function item according to the user's intention obtained in the obtaining section.

The image forming apparatus can adopt a configuration in which the function item which is the target to be changed is allotted function item identifying information for uniquely identifying the function item, the registered program referencing the function item which is the target to be changed is stored therein with the function item identifying information as registration management information, the determining section determines presence or absence of the registered program referencing the function item which is the target to be changed, through searching whether the function item identifying information is included in the registration management information in each registered program.

The image forming apparatus can adopt a configuration to further include an operation key used when carrying out various operations including a change of the initial value related to the function item which is the target to be changed; and a display section displaying various information, in which the obtaining section displays on the display section a confirmation screen for allowing a user to select whether to reflect in the appropriate registered program the change of the initial value related to the function item which is the target to be changed and encourages the user to conduct the selection operation thereby to obtain the user's intention.

The image forming apparatus can adopt a configuration in which the obtaining section displays on the display screen, together with a confirmation screen for allowing a user to select whether to reflect in the appropriate registered program the change of the initial value related to the function item which is the target to be changed, the changes of the initial value.

OPERATION AND EFFECTS OF THE INVENTION

In the image forming apparatus for achieving the first object according to the present invention, the determining section determines, at the time of changing a communication destination, the presence or absence of the registered program referencing the communication destination relating to the change. When, as a result of a determination in the determining section, it is determined that an appropriate registered program is present, an obtaining section obtains a user's intention related on whether to reflect in the appropriate registered program the change related to the communication destination. In response thereto, the deciding section decides whether to reflect in the appropriate registered program the change related to the communication destination, according to the user's intention obtained in the obtaining section. Thereby, for example, when the change related to the communication destination is proper, a user can select to reflect in the appropriate registered program the change related to the communication destination, and on the other hand, when the change related to the communication destination is not proper, the user can select not to reflect the change related to the communication destination in the appropriate registered program. Thereafter, according to the user's intention, whether to reflect in the appropriate registered program the change related to the communication destination is decided. Accordingly, even when there is the change related to the communication destination, it is possible to obtain an image forming apparatus capable of properly conducting the change related to the communication destination, through preventing an erroneous transmission to an unintended destination.

On the other hand, in the image forming apparatus for achieving the second object according to the present invention, the determining section determines, at the time of changing the initial value related to a certain function item, the presence or absence of the registered program referencing the function item which is a target to be changed. When, as a result of a determination in the determining section, it is determined that an appropriate registered program is present, the obtaining section obtains a user's intention related on whether to reflect in the appropriate registered program the change of an initial value related to the function item. In response thereto, the deciding section decides whether to reflect in the appropriate registered program the change of the initial value related to the function item, according to the user's intention obtained in the obtaining section. Thereby, the user becomes able to determine whether to reflect the change related to the initial value in the appropriate registered program based on a user's own subjective intention so that upon determining the change of the initial value of the function item is proper, the user selects to reflect in the appropriate registered program the change of the initial value, and on the other hand, upon determining that the change of the initial value related to the function item is not proper, the user selects not to reflect the change of the initial value in the appropriate registered program. Further, according to the user's intention, whether to reflect in the appropriate registered program the change of the initial value is decided. Thus, it is possible to obtain an image forming apparatus capable of conducting the change of the initial value related to a certain function item in a preferable mode in view of convenience improvement on a user side.

DETAILED DESCRIPTION OF THE INVENTION

Hereinafter, an image forming apparatus according to embodiments of the present invention is described in detail with reference to the drawings.

First Embodiment

First, a first image forming apparatus 10 according to a first embodiment is described with reference to FIG. 1 through FIG. 3.

(Block Configuration on the Periphery of the First Image Forming Apparatus 10)

Figure 1:
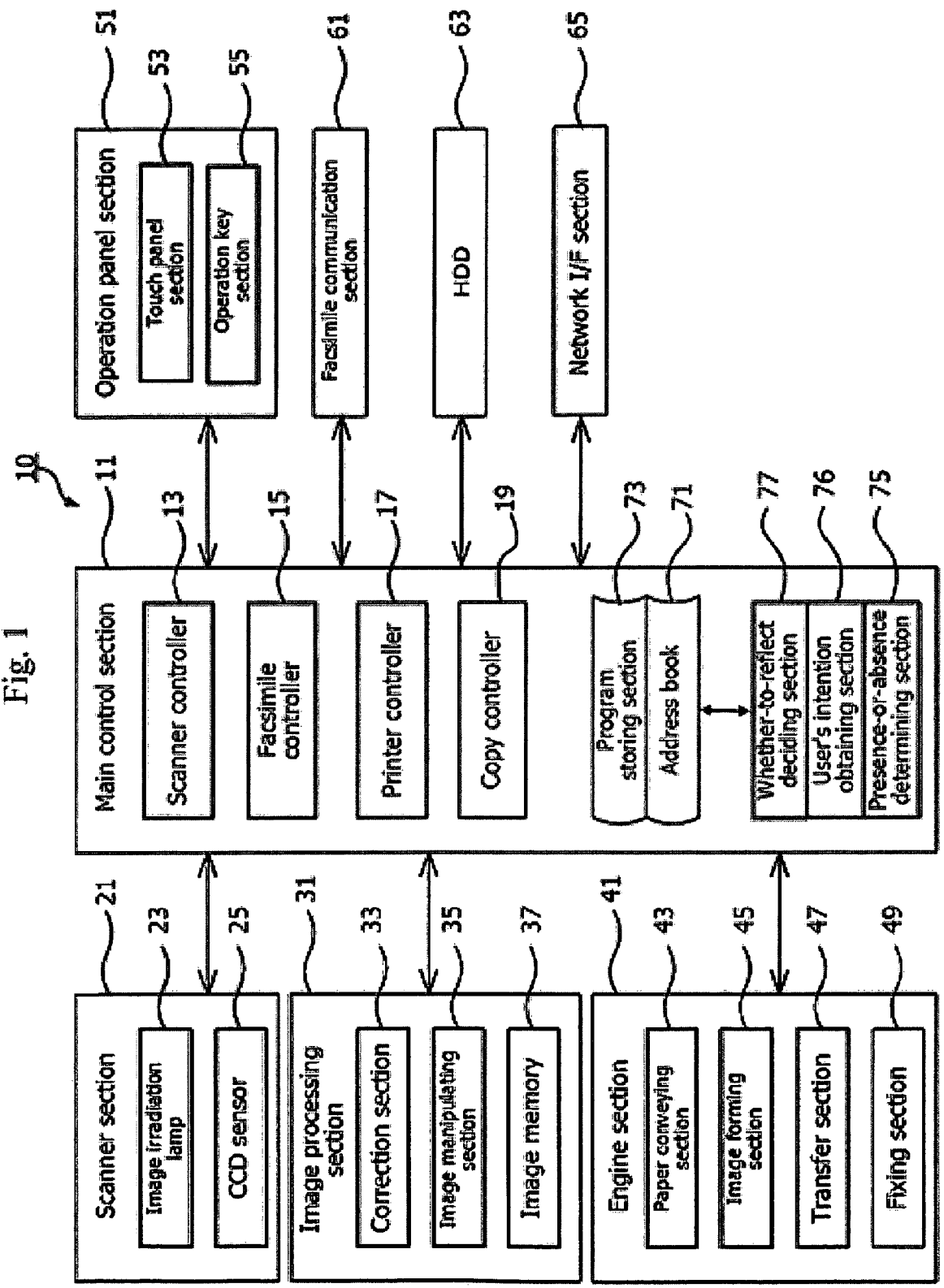
FIG. 1 is a block diagram showing an overview on the periphery of a first image forming apparatus according to a first embodiment of the present invention.

As shown in FIG. 1, the first image forming apparatus 10 according to the first embodiment makes available various functions including a copy job, a facsimile transmission/reception job, a scanner job, a print job, or a data communication job, and is controlled by a main control section 11 constituted by a microcomputer, dedicated hardware circuitry, etc. As input/output devices connected to the main control section 11 and taking charge of various functions, the image forming apparatus 10 includes a scanner section 21, an image processing section 31, an engine section 41, an operation panel section 51, a facsimile communication section 61, a hard disk drive (HDD) 63 and a network interface (I/F) section 65.

The main control section 11 houses a scanner controller 13 controlling an operation for achieving a scanner function, a facsimile controller 15 controlling an operation for achieving a facsimile function, a printer controller 17 controlling an operation for achieving a printer function, and a copy controller 19 controlling an operation for achieving a copy function. The main control section 11 has overall control for an operation of the entire apparatus.

The scanner section 21 includes an image irradiation lamp 23 and a charge coupled device (CCD) sensor 25 constituting a scanner (not shown). The image irradiation lamp 23 irradiates a document and the CCD sensor 25 receives its reflected light, whereby the scanner section 21 reads out an image from the document and outputs image data corresponding to the read-out image to the image processing section 31.

The image processing section 31 includes a correction section 33, an image manipulation section 35 and an image memory 37. The image processing section 31 processes the image data having been read out by the scanner section 21, with the use of the correction section 33 and the image manipulation section 35, as needed, and stores the processed image data on the image memory 37 or outputs the processed image data to the engine section 41, the facsimile communication section 61, etc. The correction section 33 applies a predetermined correction such as a level correction, a gamma correction, and the like, to the image data which has been read by the scanner section 21. The image manipulation section 35 performs a variety of manipulating processings such as compression or decompression and expansion or contraction of the image data.

The engine section 41 includes a paper conveying section 43 composed of a paper feeding cassette, a paper feeding roller, etc., (not shown), an image forming section 45 composed of a photosensitive drum, an exposure system, a development system, etc., (not shown), a transfer section 47 composed of a transfer roller, etc., (not shown), and a fixing section 49 composed of a fixing roller, etc., (not shown). The engine section 41 prints out an image on a sheet of paper by means of: image data which has been read out by the scanner section 21; image data which has been transmitted from a client personal computer (PC), etc., by a local area network (LAN) via the network I/F section 65; and image data of facsimile data, etc., which have been received from an external facsimile machine, etc., by using the facsimile communication section 61. More specifically, the paper conveying section 43 conveys a sheet of paper to the image forming section 45. The image forming section 45 forms a toner image corresponding to the foregoing image data. The transfer section 47 transfers the toner image on the sheet of paper. The fixing section 49 fixes the toner image on the sheet of paper to form an image.

Figure 2:
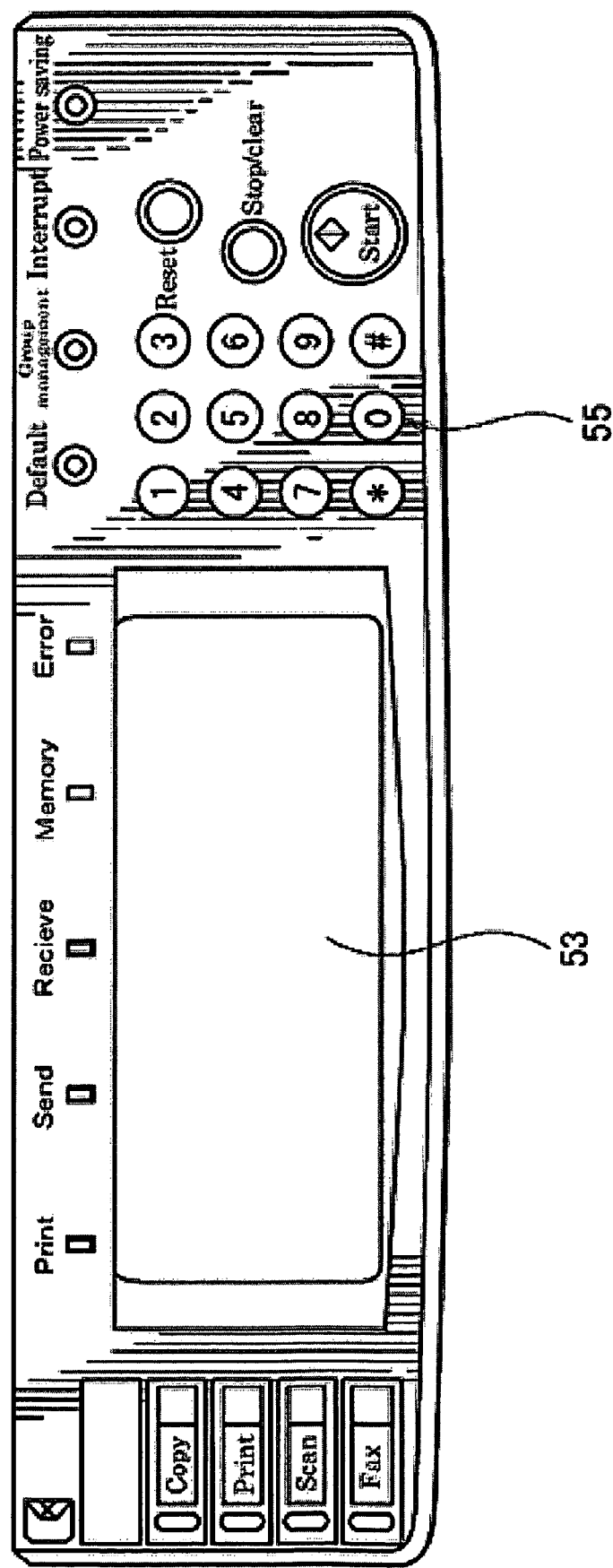
FIG. 2 is an outline view of an operation panel section in a first image forming apparatus 10.
Figure 3:
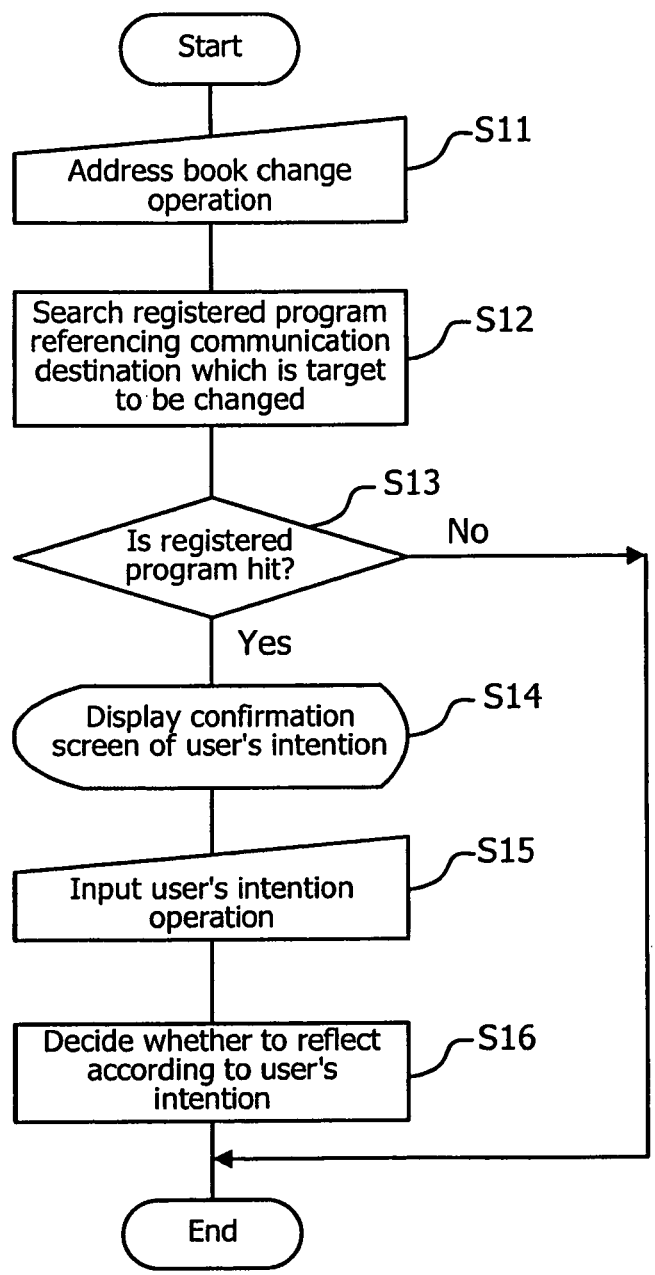
FIG. 3 is an operational flowchart in the first image forming apparatus 10.

The operation panel section 51 includes a touch panel section 53 and a function key section 55, as shown in FIG. 1 and FIG. 2. The operation panel section 51 is used in order that a user may conduct an operation related to a scanner function, a facsimile function, a printer function, a copy function, a data communication function, etc. The operation panel section 51 provides the main control section 11 with an operation command, etc., by the user.

The touch panel section 53 (corresponding to a "display section" of the present invention) is constituted by a touch panel unit, etc., formed by combining a touch panel and a color liquid crystal display (LCD). The touch panel section 53 displays a variety of operation screens, for example, information on a document size, a copy size, and the number of copies at the time of executing the copy function, and also displays operation buttons in order that the user may input a variety of operation commands by touching a relevant portion.

The operation key section 55 (corresponding to "an operation key" in the present invention) is provided with a plurality of operation keys operated by the user when selecting various functions related to the image forming process or when performing various operations including registration or a change of a communication destination. For example, the operation key section 55 is used when the user selectively conducts a key input operation of a necessary function from among a variety of functions such as a copy function, a printer function, a scanner function, a facsimile function, a data communication function, or when the user performs an input operation of registering or changing a communication destination on an address book, or when the user performs an input operation of changing an initial value related to a function item which is a target to be changed.

The facsimile communication section 61 includes an encoding/decoding section (not shown), a modulation and demodulation section (not shown), and a network control unit (NCU) (not shown). The facsimile communication section 61 transmits image data of a document which has been read out by the scanner section 21, to a facsimile machine, etc., via a telephone line, and receives image data which has been transmitted by a facsimile machine, etc.

The hard disk drive (HDD) 63 stores the image data which has been read out by the scanner section 21 and a variety of data such as an output format set in the image data. The image data stored in the HDD 63 is not only used inside the data communication device, a program, and a recording medium but also checked from a client PC, etc., via the network I/F section 65 or transferred to a predetermined folder on the client PC, a file transfer protocol (FTP) server, etc., as needed.

The network I/F section 65 uses a network interface (100Base-TX), etc., to control a variety of data communications for the client PC, etc., connected via the LAN circuitry, for example.

To prevent erroneous transmission to an unintended destination even when there is a change related to the communication destination, the main control section 11 is constituted to include: an address book 71 stored thereon with information related to the communication destination (including destination address information and destination name information. Further, examples of the destination address information include a FAX telephone number, an electronic mail address, an FTP address, an HTTP address, and an IP address); a program storing section 73 registered therein with various information including: reference information related to an address book function; a desired communication mode (for example, set a "confidential mode" to ON, set a resolution to "fine"); and combined use information of various functions (for example, information indicating use of a basic function such as a copy function and a FAX transmission function, in combination with an advanced function such as printing a plurality of copies, integrated print such as 2in1, etc., a timer transmission, a broadcast transmission, and a duplicate print); a presence-or-absence determining section 75 (corresponding to a "determining section" in the present invention) determining presence or absence of a registered program referencing the communication destination related to the change, at the time of the change of the communication destination; a user's intention obtaining section 76 (corresponding to an "obtaining section" in the present invention) obtaining a user's intention related on whether to reflect in an appropriate registered program the change related to the communication destination when it is determined that there is present the appropriate registered program as a result of a determination in the presence-or-absence determining section 75; a whether-to-reflect deciding section 77 (corresponding to a "deciding section" in the present invention) deciding whether or not to reflect in the appropriate registered program the change related to the communication destination, according to the user's intention obtained in the user's intention obtaining section 76. In addition, each communication destination registered on the address book 71 is allotted destination identifying information for uniquely identifying the communication destination. In the registered program referencing the communication destination related to the address book function, the destination identifying information is stored as registration management information. Therefore, the presence-or-absence determining section 75 has a function for determining presence or absence of the registered program referencing the communication destination related to the change through searching whether the destination identifying information is included in registration management information in each registered program.

(Operation of the First Image Forming Apparatus 10)

Subsequently, operation of the first image forming apparatus 10 is described with reference to FIG. 3.

When the user attempts a change operation with an intention of changing a FAX number of a company A registered in the address book 71, for example (step S11). In response thereto, the presence-or-absence determining section 75 searches whether the destination identifying information allotted to the communication destination related to the change is included in the registration management information in each registered program (step S12). Through this search, the presence-or-absence determining section 75 is able to determine the presence or absence of the registered program referencing the communication destination related to the change.

When it is determined that the appropriate registered program is not present as a result of the search in step S12, the main control section 11 ends all the processes.

On the other hand, when it is determined that the appropriate registered program is present as a result of the search in step S12, the user's intention obtaining section 76 displays on the touch panel section 53 a confirmation screen allowing the user to select whether to reflect in the appropriate registered program the change related to the communication destination and the changes related to the communication destination (for example, "FAX number is changed. Select and operate "OK" if you accept.") (step S14). The user's intention obtaining section 76 encourages the user to conduct this selection operation thereby to obtain the user's intention (step S15).

When the user's intention is obtained in step S15, the whether-to-reflect deciding section 77 decides whether to reflect in the appropriate registered program the change related to the communication destination according to the obtained user's intention (step S16).

In addition, it may be possible to adopt a configuration to display a warning message informing that the communication destination is changed (for example, "in this registered program, the FAX number is changed from a registration time) at the time of starting the registered program on which the changes of the communication destination are thus reflected after the reflection (for example, while the number of times of cumulative starts after the reflection reaches three, etc.). In this way, a further improved erroneous transmission prevention effect can be expected.

(Effects of the First Image Forming Apparatus 10)

As described above, according to the first image forming apparatus 10, at the time of changing the communication destination, when the registered program referencing the communication destination related to the change is present, the main control section 11 confirms the user's intention related on whether to reflect in the appropriate registered program the change related to the communication destination, and according to the user's intention thus obtained, decides whether to reflect in the appropriate registered program the change related to the communication destination. Therefore, even when there is a change related to the communication destination, it is possible to properly conduct the change related to the communication destination through preventing the erroneous transmission to a destination against the user's intention.

Second Embodiment

Subsequently, a second image forming apparatus 20 according to a second embodiment is described with reference to FIG. 4 and FIG. 5. In addition, configurations of functional sections are nearly common between the aforementioned first image forming apparatus 10 and the second image forming apparatus 20 described below. Accordingly, the functional sections in common between the first and second image forming apparatuses 10 and 20 are denoted by the same symbols. A description will be given focusing on differences between them while any overlapping description is omitted.

(Block Configuration on the Periphery of the Second Image Forming Apparatus 20)

Figure 4:
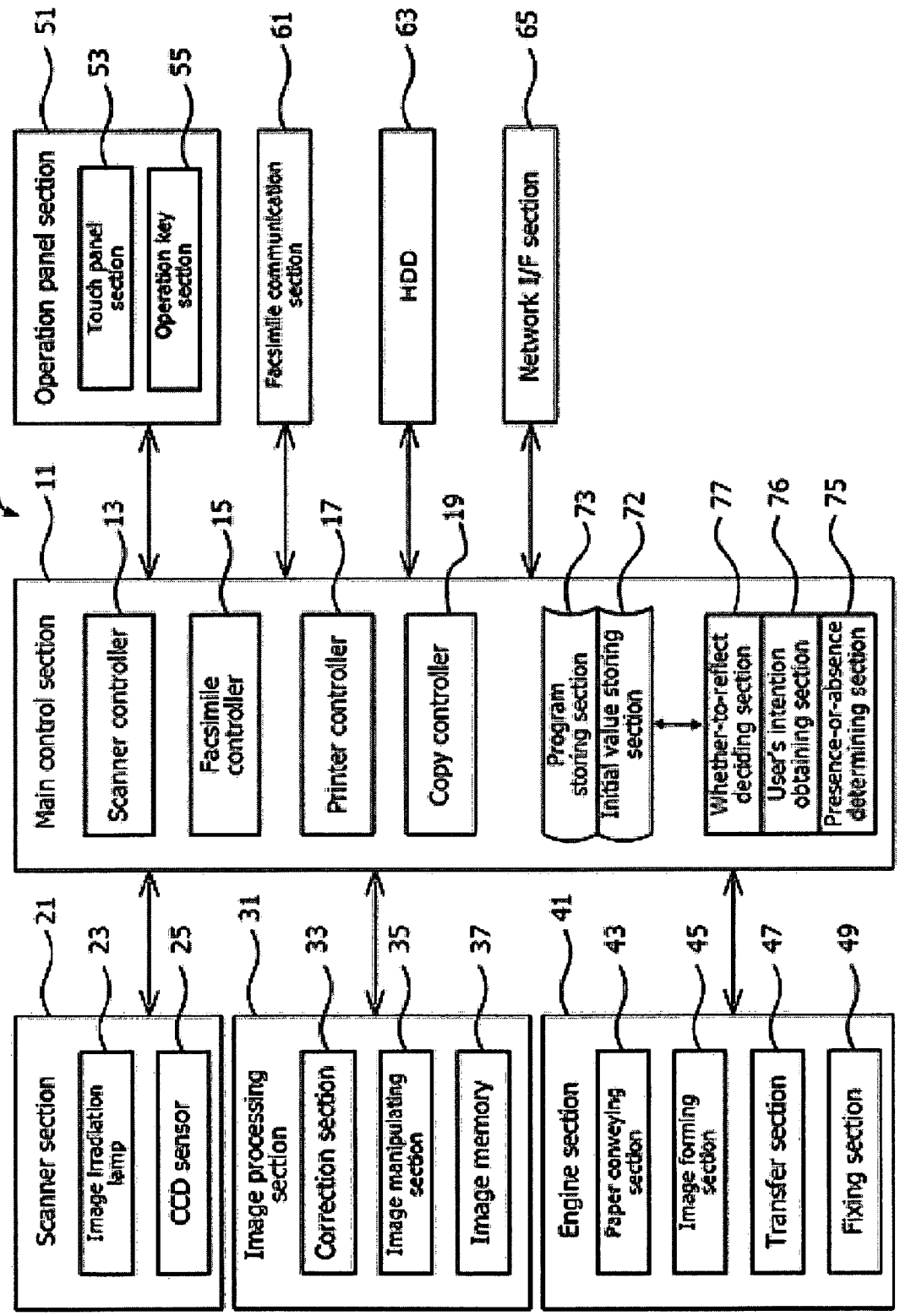
FIG. 4 is a block diagram showing an overview on the periphery of a second image forming apparatus according to a second embodiment of the present invention.
Figure 5:
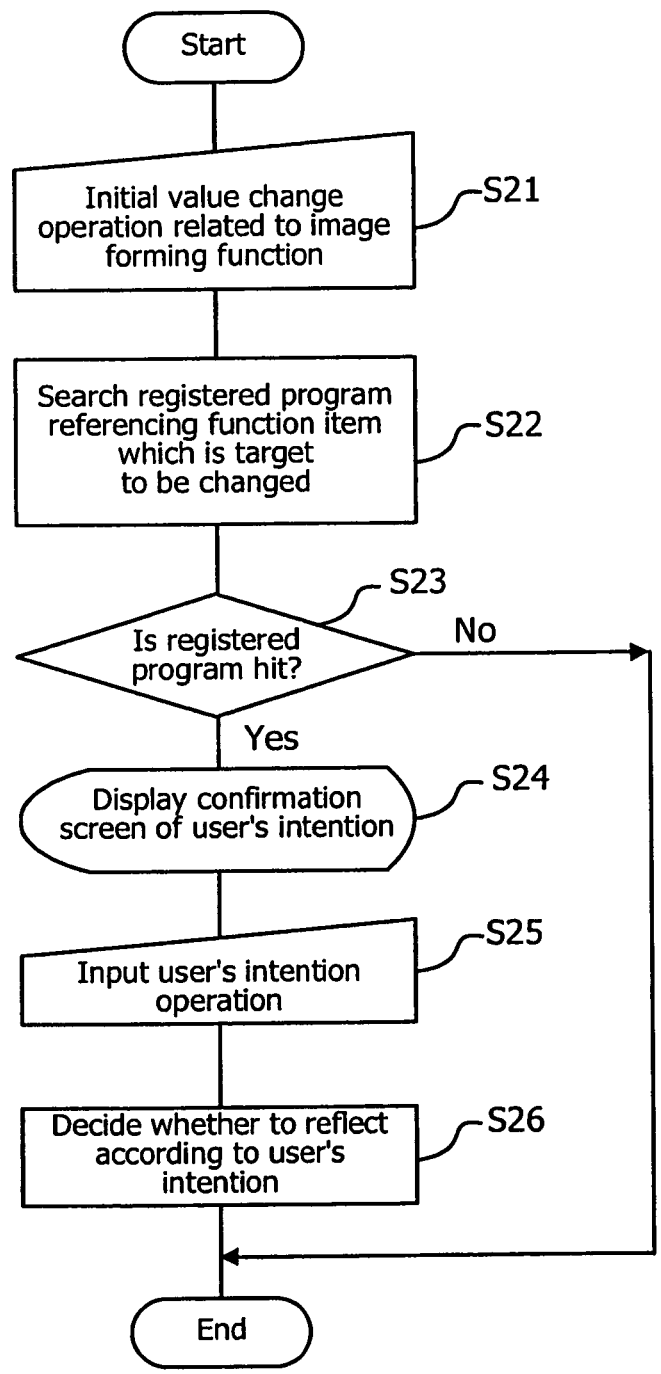
FIG. 5 is an operational flowchart in the second image forming apparatus.

As shown in FIG. 4, the aforementioned first image forming apparatus 10 is provided with the address book 71 registered thereon with a plurality of communication destinations in order to properly conduct the change related to the communication destination. On the other hand, the second image forming apparatus 20 is provided with, in addition to the address book 71 or instead of the address book 71, an initial value storing section 72 registered therein with an initial value related to the function item in order to conduct a change of an initial value related to a certain function item in a preferable mode in view of improving convenience on a user side.

That is, in the second image forming apparatus 20, the main control section 11 is constituted to include: the aforementioned initial value storing section 72; a program storing section 73 registered therein with information related to a combined use of various function items (for example, the information indicating use of a basic function such as a copy function or a FAX transmission function in combination with an advanced function such as printing a plurality of copies, integrated print such as 2in1, etc., a timer transmission, a broadcast transmission, and a duplicate print), together with reference information associated with a function item which is a target to be changed. A presence-or-absence determining section 75 (corresponding to a "determining section" in the present invention), at the time of changing the initial value related to a certain function item, determining the presence or absence of a registered program referencing the function item which is the target to be changed; a user's intention obtaining section 76 (corresponding to an "obtaining section" in the present invention) obtaining a user's intention related on whether to reflect in an appropriate registered program the change of the initial value related to the function item when it is determined that there is present the appropriate registered program as a result of a determination in the presence-or-absence determining section 75; a whether-to-reflect deciding section 77 (corresponding to a "deciding section" in the present invention) deciding whether or not to reflect in the appropriate registered program the change of the initial value related to the function item according to the user's intention obtained in the user's intention obtaining section 76. To the function item to which the initial value registered in the initial value storing section 71 belongs, function item identifying information for uniquely identifying the function item is allotted. In the registered program referencing the function item which is the target to be changed, the function item identifying information is stored as the registration management information. Therefore, the presence-or-absence determining section 75 is constituted to determine the presence or absence of the registered program referencing the function item which is the target to be changed, through searching whether the function item identifying information is included in the registration management information in each registered program.

(Operation of the Second Image Forming Apparatus 20)

Subsequently, operation of the second image forming apparatus 20 is described with reference to FIG. 5.

For example, when the user attempts a change operation with an intention of changing an initial value related to a function item about a resolution, in various initial values registered in the initial value storing section 71, from a default "normal mode" to a "fine mode" (step S21), in response thereto, the presence-or-absence determining section 75 searches whether the function item identifying information allotted to the function item related to the change is included in the registration management information in each registered program (step S22). Through this search, the presence-or-absence determining section 75 is able to determine the presence or absence of the registered program referencing the function item which is the target to be changed.

When it is determined that the appropriate registered program is not present as a result of the search in step S22, the main control section 11 ends all the processes.

On the other hand, when it is determined that the appropriate registered program is present as a result of the search in step S22 ("YES" in step S23), the user's intention obtaining section 76 displays on the touch panel section 53 a confirmation screen allowing the user to select whether to reflect in the appropriate registered program the change related to the function item and changes related to the function item (step S24). The user's intention obtaining section 76 encourages the user to conduct this selection operation thereby to obtain the user's intention (step S25).

In this case, the operations in steps S24 to S25 are described with an assumed case that, for example, as a registered program, that related to a combination of a memory transmission mode as a facsimile transmission mode and a required one-touch key number as a communication destination is present, and the same registered program references the "resolution" as the function item which is the target to be changed. In this case, when the user attempts to change the initial value related to the function item about the resolution from a default "normal mode" to a "fine mode," a confirmation screen allowing th user to select whether to reflect in the same registered program the change of the initial value and the changes related to the function item are displayed on the touch panel section 53 such as (the initial value related to the function item about the resolution is changed from the default "normal mode" to the "fine mode." If you accept, select and operate "OK"), for example. As a result of the user being encouraged to conduct this selection operation, the user's intention is obtained.

In this case, a configuration to display a message indicating that the initial value related to the function item about the resolution is changed from the default "normal mode" to the "fine mode," together with a message indicating "due to this change, the resolution is increased," may be adopted.

On the other hand, in a case that the initial value related to the function item about the resolution is changed from a default "fine mode" to the "normal mode", a configuration to display a message indicating the above-described change, together with a message indicating "due to this change, the resolution is decreased," may be adopted.

When the user's intention is obtained in step S25, the whether-to-reflect deciding section 77 decides whether to reflect in the appropriate registered program the change of the initial value related to the function item according to the obtained user's intention (step S26).

In addition, it may be possible to adopt a configuration to display a warning message informing that the function item is changed (for example, "in this registered program, the resolution is changed from a registration time) at the time of starting the registered program in which the changes of the function item are thus reflected after the reflection (for example, while the number of times of cumulative starts after the reflection reaches three, etc.). In this way, it may be possible to prevent an unintended initial value change to facilitate improvement in convenience on the user side.

(Effects of the Second Image Forming Apparatus 20)

As described above, according to the second image forming apparatus 20, at the time of changing the initial value related to a certain function item, when the registered program referencing the function item which is a target to be changed is present, the main control section 11 confirms the user's intention related on whether to reflect in the appropriate registered program the change of the initial value related to the function item, and according to the user's intention thus obtained, decides whether to reflect in the appropriate registered program the change of the initial value related to the function item. The change of the initial value related to a certain function item can be conducted in a preferable mode in view of convenience improvement on the user side.

[Other]

The present invention is not limited to the aforementioned embodiments and can be modified as appropriate without departing from the gist or technical idea of the present invention understood from the claims and the entire specification. An image forming apparatus with such a modification is also to fall within the technical scope of the present invention.

For example, in the first embodiment of the present invention, with respect to the user who confirms the change related to the communication destination, a mode in which no particular restriction is provided is exemplary described. However, the present invention is not limited to such a mode. For example, it may be possible to adopt a configuration such that at the time of carrying out the change related to the communication destination, the user is requested to make a key input operation of user identifying information and a personal identification number, and the change related to the communication destination is granted only for an authorized user. In this way, a further improved erroneous transmission prevention effect can be expected.

Further, in the second embodiment of the present invention, with respect to the user who confirms the change related to the function item, a mode in which no particular restriction is provided is exemplary described. However, the present invention is not limited to such a mode. For example, it may be possible to adopt a configuration such that at the time of carrying out the change related to the function item, the user is requested to make a key input operation of user identifying information and a personal identification number, and the change related to the function item is granted only for an authorized user. In this way, a further convenience improvement effect on the user side can be expected.

Finally, it is to be understood that as the applicable scope of the present invention, the present invention can be applied to every facsimile device having an image forming function, for example.

What is claimed is:

1. An image forming apparatus that performs a data communication function, an address book function, and a program function,
   wherein for the address book function, communication destinations and corresponding destination identifying information are registered in an address book, and
   wherein for the program function, registration management information, including communication destinations and corresponding destination identifying information selected from said communication destinations and corresponding destination identifying information registered by the address book function, is stored in a program storing section as part of registration data for a registered program among a plurality of registration entries for a plurality of registered programs, wherein the address book and program storing section are separate storage constructs;
   the image forming apparatus comprising:
   a main control section for providing overall control of operating functions of the image forming apparatus, and having internal memory for storing therein the address book and the program storing section as separate storage constructs;
   a determining section triggered in direct response to a change in a communication destination stored for an entry in the address book to perform a search of the registration management information in the program storing section to identify an entry in the program storing section for which the destination identifying information of the registration management information corresponds to the changed address book entry;
   an obtaining section triggered in direct response to the identification of said entry in the program storage section to obtain the user's intention on whether to reflect the updated destination identifying information in the registration data of the identified entry in the program storage section; and
   a deciding section that decides whether to reflect the changes to the changed address book entry in the registration data of the identified entry in the program storage section.

2. The image forming apparatus according to claim 1, wherein each communication destination is allotted said corresponding destination identifying information for uniquely identifying the communication destination, and wherein the registered program referencing the communication destination related to the address book function is stored therein with the destination identifying information as registration management information among the registration data for the registered program.

3. The image forming apparatus according to claim 1, further comprising:
   an operation key used when carrying out various operations including registration or a change of the communication destination; and
   a display section for displaying various information, wherein
   the obtaining section displays on the display section a confirmation screen for allowing a user to select whether to reflect in the identified program storing section entry the change related to the communication destination and encourages the user to conduct the selection operation thereby to obtain the user's intention.

4. The image forming apparatus according to claim 3, wherein the obtaining section displays, together with the confirmation screen for allowing the user to select whether to reflect in the identified program storing section entry the change related to the communication destination, changes related to the communication destination, on a display screen of the display section.

5. An image forming apparatus, comprising:
   an initial value changing function capable of changing initial values, which are stored in a first data structure, related to various function items about an image formation;
   a program function that registers registration management information specifying a combination of function items selected from the various function items having the changeable initial values, and function item identifying information allotted to the selected function items, as part of registration data for a registered program among a plurality of registration entries stored in a program storing section, wherein the registered program collectively sets the image forming apparatus according to the registration management information, and wherein the first data structure and program storing section are separate storage constructs;
   a main control section for providing overall control of operating functions of the image forming apparatus, and having internal memory for storing therein the first data structure and the program storing section as separate storage constructs;
   a determining section triggered in direct response to a change in an initial value of a function item among said various function items at the image forming apparatus stored in the first data structure, to perform a search to determine presence or absence of a registered program in the program storing section for which the function item identifying information allotted to the function item having the changed initial value is in the registration management information for each registered program of a plurality of registered programs in the program storing section;

an obtaining section obtaining, triggered in direct response to and following a determination in the determining section that an appropriate registered program referencing the function item having the changed initial value is present, a user's intention whether to associate the changed initial value of the function item in the initial value changing function with the appropriate registered program; and a deciding section deciding whether to associate the changed initial value of the function item to the appropriate registered program according to the user's intention obtained by the obtaining section.

6. The image forming apparatus according to claim 5, wherein the changed function item is allotted function item identifying information for uniquely identifying the changed function item, and wherein the registered program referencing the changed function item is stored therein with the changed function item identifying information as registration management information.

7. The image forming apparatus according to claim 5, further comprising:

an operation key used when carrying out various operations including a change of the initial value related to the function item which is thereby changed; and a display section displaying various information, wherein the obtaining section displays on the display section a confirmation screen for allowing a user to select whether to reflect in the appropriate registered program the changed function item and encourages the user to conduct the selection operation thereby to obtain the user's intention.

8. The image forming apparatus according to claim 7, wherein the obtaining section displays, on a display screen of the display section, the change of the initial value related to the changed function item, together with the confirmation screen for allowing the user to select whether to reflect in the appropriate registered program the change of the initial value related to the changed function item.

9. An image forming apparatus, comprising:

a main control section for providing overall control of operating functions of the image forming apparatus, and having internal memory for storing therein a first data structure and a program storing section as separate storage constructs;

a processor that performs an initial value changing function capable of changing initial values related to various function items about an image formation stored in the first data structure, and a program function that registers registration management information specifying a combination of function items selected from the various function items having the changeable initial values, and function item identifying information allotted to the selected function items, to an entry in the program storage section for a registered program that collectively sets the image forming apparatus according to the registration management information;

a determining section triggered in direct response to and following changing an initial value of a function item among said various function items in the first data structure, presence or absence of a registered program in the program storage section referencing a changed function item by searching the program storage section to determine whether function item identifying information allotted to the function item having the changed initial value is in the registration management information for each registered program of a plurality of registered programs in the program storage section;

an obtaining section triggered in direct response to and following a determination in the determining section that an appropriate registered program referencing the function item having the changed initial value is present in the program storage section, a user's intention whether to associate the changed initial value of the function item in the initial value changing function to the appropriate registered program; and a deciding section that decides whether to associate the changed initial value of the function item with the appropriate registered program based on the user's intention obtained by the obtaining section.

* * * * *